April 7, 1964  J. D. RINK  3,127,939

LAWN TRIMMER

Filed Dec. 18, 1961

INVENTOR.
JOHN DENTER RINK

BY *Edward A. Sokolski*

ATTORNEY 3,127,939
LAWN TRIMMER
John Denter Rink, 5614 Via Collado, Torrance, Calif., assignor of twenty percent to Edward A. Sokolski
Filed Dec. 18, 1961, Ser. No. 160,121
4 Claims. (Cl. 172—13)

This invention relates to a lawn trimmer and more particularly to such a trimmer for removing lawn growth around circular sprinkler heads.

Sprinkler systems used for watering lawns generally include a number of circular sprinkler heads which are mounted flush with the surface of the lawn. Grass and other lawn growth if not periodically trimmed away from the sprinkler heads will impair their sprinkling capabilities. Trimming around sprinkler heads is generally accomplished with a pair of hand clippers which is not only tedious but generally produces a far from aesthetic end result.

Various trimmers for sprinkler heads have been developed. These, however, are either overcomplicated in their design, making for high cost of fabrication or have limitations in their operation. These limitations include the necessity for using a separate trimmer for each particular diameter sprinkler head and the inability to cut around sprinkler heads located close to the edge of the lawn near cement walkways and the like.

The device of this invention overcomes the shortcomings of the prior art devices by providing a trimmer of very simple design capable of use with sprinkler heads of a variety of diameters and capable of trimming around heads located very close to cement walks. This end result is achieved by providing a single cylindrical member having a cutting edge at the bottom end thereof and a plurality of wedge-shaped or triangular pieces which extend inwardly from the inner circumference of the cylindrical member. The taper of these wedge-shaped pieces runs towards the bottom portion of the cylindrical member, and they are thereby self-adjusting for cutting engagement with the rim portions of various size sprinkler heads. Handle means are provided for manipulating the wedge-shaped cutters in rotatable engagement with a sprinkler head rim to cut all lawn growth forced therebetween. The wedge-shaped pieces also act to furrow the earth and separated lawn growth encountered by the lower portions thereof.

It is therefore an object of this invention to provide an improved sprinkler head trimmer.

It is a further object of this invention to facilitate the removal of lawn growth around circular sprinkler heads.

It is a still further object of this invention to provide a simple yet highly effective sprinkler head trimmer which can be very economically fabricated.

It is another object of this invention to provide a sprinkler head trimmer suitable for use with sprinkler heads of various diameters.

It is still another object of this invention to provide a sprinkler head trimmer capable of use in trimming around sprinkler heads positioned close to cement driveways and walks.

Other objects of this invention will become apparent after the following description taken in connection with the accompanying drawings of which FIG. 1 is a perspective view of the preferred embodiment of the device of the invention;

Figure 1:
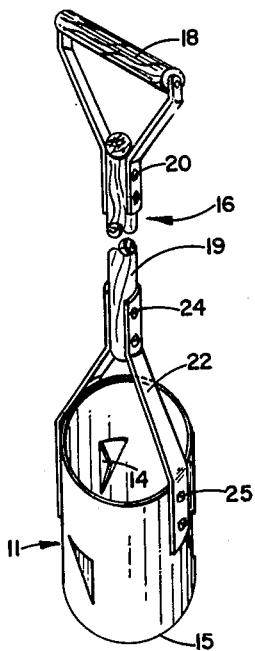
Figure 2:
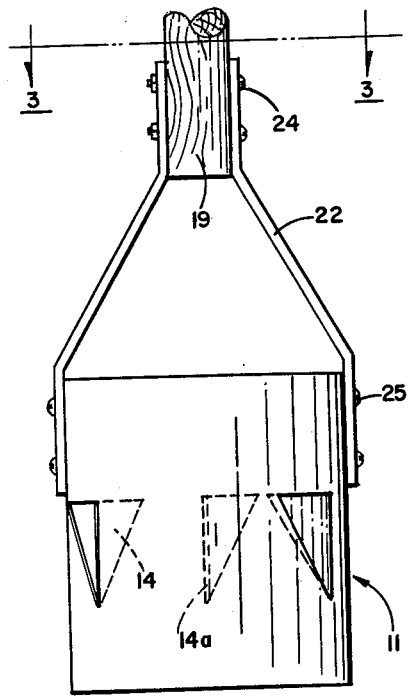
FIG. 2 is a side elevation view of the embodiment of FIG. 1.

Let us now refer to the various figures illustrating a preferred embodiment of the device of the invention. Cylindrical cutting member 11 has a plurality of wedge or triangularly shaped vanes 14 extending inwardly from its inner surface towards its longitudinal central axis. Vanes 14 extend in a direction substantially normal to the adjoining portion of the inner wall of the cylinder, and the taper of the wedge runs towards the bottom portion of cylindrical member 11. Vanes 14 have sharpened edges 14a which are utilized to cut the grass and other growth against the rim of a sprinkler head.

Vanes 14 may be formed from the wall of cylindrical cutting member 11 as shown in the preferred embodiment by means of a punch and die, the sections cut out in this fashion being bent inwardly at an angle of substantially 90 degrees to the inner wall of the cylindrical member. If so desired, the vanes may alternatively be formed separately and then welded onto the inner wall of the cylindrical member. The bottom edge 15 of cylindrical cutting member 11 should be appropriately sharpened to form a suitable cutting edge for cutting into the turf and slicing grass roots.

Means for manipulating cutting member 11 is provided in the form of handle member 16 which includes a hand grasp 18 fixedly attached to a shaft 19 by means of bolts 20 or other suitable means. Handle member 16 is fixedly connected to cutting member 11 by means of brackets 22. Brackets 22 are fixedly attached at one end to shaft 19 by means of bolts 24 and fixedly joined at the other end thereof to cutting member 11 by rivets 25, welding, or other suitable means.

Figure 4:
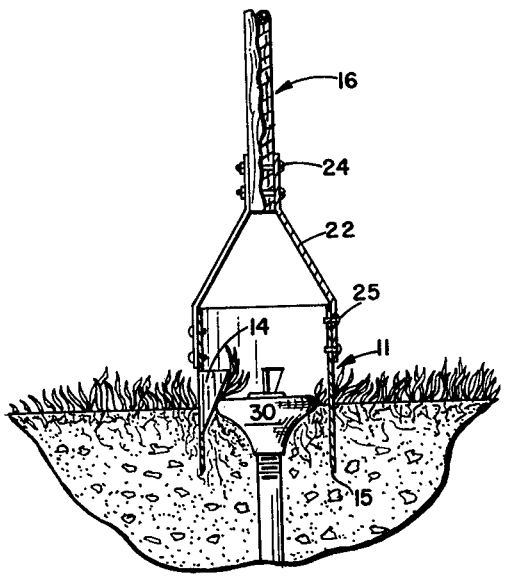
Figure 3:
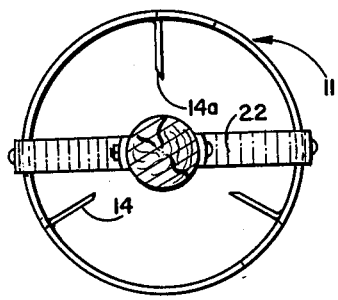
FIG. 3 is a cross-sectional view of the preferred embodiment of the device of the invention taken as indicated by the line 3—3 in FIG. 2, And, FIG. 4 is an elevation cross-sectional view of the preferred embodiment of the device of the invention shown in operative engagement with a sprinkler head.

Referring now to FIG. 4, the preferred embodiment of the invention is illustrated in operation. Cutting member 11 is pushed into the turf around sprinkler head 30 by means of handle member 16. The cutting member will come to rest, restrained from further downward motion with the edge of vanes 14 abutting against the rim of sprinkler head 30. It is to be noted that such engagement between the vanes and the sprinkler head rim can be attained with various diameter sprinkler heads, with sprinkler heads of greater diameter riding along lower portions of the cutting vanes than those of lesser diameter. The device of the invention thus is self-adjusting for use with sprinkler heads of various diameters.

The cutting edge 15 severs creeping grass and roots when the cutting member is inserted into the earth. The major cutting and furrowing operation is accomplished by rotatable manipulation of handle member 16 with simultaneous application of downward pressure. With such manipulation, vanes 14 rotatably engage the rim of the sprinkler head and cut off the grass that was enclosed between the cutting member and the rim when the cutting member was pushed into the turf. At the same time, cutting edge 15 effectively slices off any roots which it engages. The portions of vanes 14 which are rotated below the ground surface dislodge and cut off any roots they encounter and furrow the earth in their path.

It is preferable to utilize an odd number of vanes spaced at equal intervals around the cutting member, this number being at least three. This is necessary to assure proper rotatable action when the device of the invention is utilized with sprinkler heads having lug wrench slots formed in their rims. Such slots are usually two in number and positioned opposite each other. With an odd number of vanes, this number being three or more, any one of the vanes will be prevented from dropping into a sprinkler head slot when positioned opposite it by the restraining action of the other vanes abutting against the sprinkler head rim. If no means were provided to prevent the vanes from moving into the lug wrench slots, engagement of a vane in a slot would impair further rotation of the cutting member.

The device of this invention thus provides a simple and economically fabricated yet highly effective device for neatly trimming around sprinkler heads. The device self-adjusts itself for use with sprinkler heads of various diameters, can be used to trim around sprinkler heads in close proximity to concrete walks, and enables thorough trimming around sprinkler heads with a minimum effort on the part of the operator.

While the invention has been described and illustrated in detail, it is to be clearly understood that this is intended by way of illustration and example only and is not to be taken by way of limitation, the spirit and scope of the invention being limited only by the terms of the appended claims.

I claim:

1. In a trimmer for trimming lawn growth around a circular lawn sprinkler head,
   a cylindrical member having a plurality of planar cutting blades extending inwardly from the inner circumference of said cylindrical member in a direction substantially normal to the adjoining portion of the inner wall of said member, the edges of said blades adjacent to said inner circumference extending along axes substantially parallel to the longitudinal axis of said cylindrical member, said blades being in the shape of a right triangle, the hypotenuse of said triangle converging with said inner wall in a direction towards the bottom end of said member, said blades further being spaced substantially equally from the edges of said cylindrical member, and
   means attached to the top portion of said cylindrical member for rotating the blades of said member against the rim of said sprinkler head.

2. A trimmer for trimming lawn growth around a circular lawn sprinkler head comprising
   a cylindrical cutting member having a plurality of wedge-shaped vanes extending inwardly towards the longitudinal central axis of said cylindrical member, the edges of said vanes adjacent to the inner walls of said cylindrical member extending along axes substantially parallel to the longitudial axis of said member, said wedge-shaped vanes tapering in the direction towards the bottom end of said member, said vanes having cutting edges adapted to engage the rim of said sprinkler head when said member is placed over said head in concentric relationship therewith, said cutting member further having a continuous circular cutting edge at the bottom end thereof said vanes being spaced substantially equally from said cutting edge, and
   means attached to the top portion of said member for manipulating said member with said vanes in rotatable engagement with the rim of said sprinkler head.

3. The device as recited in claim 2 wherein said means for manipulating said member comprises a pair of brackets attached to opposite sides of the top portion of said member and a handle member attached to said brackets.

4. A trimmer for trimming lawn growth around a circular lawn sprinkler head comprising
   a cylindrical cutting member having an odd number of wedge-shaped vanes extending inwardly towards the longitudinal central axis of said cylindrical member, the edges of said wedge shaped vanes adjacent to the inner walls of said cylindrical member extending along axes substantially parallel to the longitudinal axis of said member, said odd number being at least three said wedge-shaped vanes tapering in the direction towards the bottom end of said member, said member having a continuous cutting edge at the bottom end thereof, said vanes having cutting edges adapted to engage the rim of said sprinkler head when said member is placed over said head in concentric relationship therewith, said vanes being spaced substantially equally from said cutting edge by a portion of the wall of said cylindrical member, and
   means attached to the top portion of said member for manipulating said vanes in rotatable engagement with the rim of said sprinkler head, said manipulating means including brackets attached to the top portion of said member, a shaft attached to said brackets, and a hand grasp attached to said shaft.

References Cited in the file of this patent

UNITED STATES PATENTS

| 799,880 | Tonge | Sept. 19, 1905 |
| 1,866,073 | Aberle | July 5, 1932 |
| 1,977,017 | Schiller | Oct. 16, 1934 |
| 2,263,531 | Kevorkian | Nov. 18, 1941 |
| 2,670,537 | Cambell | Mar. 2, 1954 |
| 2,691,823 | Dombrowski | Oct. 19, 1954 |
| 2,764,926 | Heimbigner | Oct. 2, 1956 |
| 2,809,864 | Carr | Oct. 15, 1957 |

FOREIGN PATENTS

| 669,987 | France | Aug. 12, 1929 |